(12) United States Patent
Iverson

(10) Patent No.: US 6,957,075 B1
(45) Date of Patent: Oct. 18, 2005

(54) METHOD AND APPARATUS FOR PROVIDING A LOCATION BASED APPLIANCE PERSONALITY

(75) Inventor: Vaughn S. Iverson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/241,834

(22) Filed: Feb. 1, 1999

(51) Int. Cl.$^7$ ............................... H04Q 7/20
(52) U.S. Cl. .................. 455/456.3; 455/419; 455/557; 455/552.1
(58) Field of Search .............. 455/456.3, 457, 455/418, 419, 412.1, 422.1, 434, 464, 566, 455/557, 432.3, 556.1, 558, 12.1, 556.2, 455/13.1, 427, 405, 414.1, 414.2, 552.1, 455/553.8, 3.03, 456.1, 41.2, 41.1, 553.1

(56) References Cited

U.S. PATENT DOCUMENTS

| | | | |
|---|---|---|---|
| 6,009,330 A * | 12/1999 | Kennedy et al. ............ 455/445 |
| 6,021,324 A * | 2/2000 | Sizer et al. ................... 455/403 |
| 6,091,956 A * | 7/2000 | Hollenberg ................... 455/456 |
| 6,157,945 A * | 12/2000 | Balma et al. ................ 709/206 |
| 6,181,952 B1 * | 1/2001 | Murata ......................... 455/552 |
| 6,226,367 B1 * | 5/2001 | Smith et al. ................. 455/415 |
| 6,346,891 B1 * | 2/2002 | Feinleib et al. ......... 340/825.69 |
| 6,349,203 B1 * | 2/2002 | Asaoka et al. .............. 455/414 |
| 6,563,430 B1 * | 5/2003 | Kemink et al. ......... 340/825.49 |
| 6,591,112 B1 * | 7/2003 | Siccardo et al. ............ 455/521 |
| 6,832,083 B1 * | 12/2004 | Oba et al. ................. 455/412.1 |

* cited by examiner

Primary Examiner—Nay Maung
Assistant Examiner—John J. Lee
(74) Attorney, Agent, or Firm—Derek J. Reynolds

(57) ABSTRACT

A method for providing an appliance personality is presented comprising ascertaining a current location/location type for the electronic appliance, selecting a suitable electronic appliance personality based, at least in part, on the ascertained location/location type of the electronic appliance and provisioning the selected appliance personality on the electronic appliance.

15 Claims, 7 Drawing Sheets

| LOCATION TYPE 302 | TIME DELAY 304 | SIGNAL ID 306 | LATITUDE 308 | LONGITUDE 310 | ELEVATION 312 | IR IDENTIFIER 314 | RATE OF CHANGE 316 | DEFAULT PERSONALITY 318 |
|---|---|---|---|---|---|---|---|---|
| HOME 320 | 3 MS | 3128 | | | | KITCHEN | | e RECIPE BOX |
| | | | | | | STUDY | ∼ | INTERNET FINANCIAL TOOLS |
| OFFICE 322 | 2 MS | 2753 | 126°8" | 39°0" | 390' | OFFICE | | PERSONAL COMPUTER |
| | 35 MS | 2770 | | | | CONF. ROOM | | |
| MOBILE 324 | ∼ | ∼ | ∼ | ∼ | <15k' | | <100 MPH | GPS (PDA) |
| AIRPLANE 326 | ∼ | ∼ | ∼ | ∼ | >1500' | | >115 MPH | PDA |

Fig. 4

| INTERFACE CHARACTERISTICS | HOME | | WORK | | AUTO | AIRPLANE | ... |
|---|---|---|---|---|---|---|---|
| | KITCHEN | STUDY | OFFICE | CONF. ROOM | | | |
| LIBRARY | PERSONAL | PERSONAL | REF. | REF. | PERSONAL | REFERENCE | |
| NEWS | LOCAL | LOCAL | BUS. | BUS. | — | BUSINESS | |
| FINANCIAL FILES | — | LOCKED | — | — | — | LOCKED | |
| RECIPE BOX | YES | — | — | — | — | — | |
| FONT_CHARACTER | | | | | | | |
| FONT_SIZE | 18 PT. | 12 PT. | 12 PT. | 12 PT. | 14 PT. | 12 PT. | |
| ELECTRONIC MAIL | | YES | YES | — | — | — | |
| FACSIMILE | | YES | YES | YES | — | — | |
| SPORTS | | YES | — | — | — | YES | |
| OFFICE FILES | — | — | YES | LOCKED | — | — | |
| MARKET_TICKER | — | YES | YES | — | YES | YES | |
| RESEARCH_LIBRARY | — | YES | YES | YES | YES | YES | |
| DESIGN_TOOLS | — | YES | YES | — | — | YES | |
| DAY PLANNER | — | YES | YES | — | — | YES | |
| RADIO | — | YES | — | — | YES | NO | |
| GPS | — | NO | — | — | YES | NO | |

METHOD AND APPARATUS FOR PROVIDING A LOCATION BASED APPLIANCE PERSONALITY

BACKGROUND OF THE INVENTION

1. Field of the Invention

The present invention relates to the field of electronic devices and, in particular, to a method and apparatus for enabling electronic devices to modify their user interface, application set and, therefore, their perceived functionality based, at least in part, on the location of the electronic device.

2. Background Information

The evolution of electronic devices continues at an ever increasing rate. Indeed, electronic devices have infiltrated many areas of every day life to the point where they are commonly thought of as household or office "appliances" as we become ever more deeply entrenched in the electronic age. Examples of this evolution abound as electronic organizers have all but replaced paper-based calendars and organizers; pagers and cellular phones have released us from the bond of wireline telephone systems; substantially instantaneous communication via electronic mail has supplanted its slower postal service counterpart; and the global communications network colloquially referred to as the Internet has opened the libraries of the world to anyone with a computer (in any of its many forms) and a modem.

In the continuing effort to improve the usability of such electronic appliances which they produce, manufacturers have focused on the form factor, e.g., size, of the appliance. That is, the effort expended by manufacturers of electronic appliances has been to reduce the size of the electronic appliance, its power consumption, and the heat generated by the appliance to make it more portable for today's highly mobile users. The size of, for example, notebook computers, personal digital assistants (PDA's), personal communication systems (PCS) handsets, pagers and personal navigation systems (e.g., utilizing satellite-based global positioning system (GPS) technology) have all been reduced to make them easier to fit into a briefcase, a backpack or a shirt pocket.

Although the reduced size of these appliances has, indeed, made them more appealing to the masses, many consumers have realized that these smaller devices are merely a reflection of their larger ancestors. That is, the smaller electronic appliances provide the same information and application set using the same user interface as their larger counterpart. For example, the user of a computer system will typically utilize the same operating system rendering the same user interface irregardless of whether the computer is being used in the home or office.

Those skilled in the art have begun to realize that users of electronic appliances often have different electronic appliance needs depending upon where it is being used. For example, someone using the appliance at work will need ready access to work files, phone directories and the like, whereas a home user of the device may need ready access to home finances, games and educational applications, personal phone directories and the like. A salesman, using the appliance on a business trip may well have a different and unique set of needs altogether, requiring the device to be utilized as a pager, facsimile machine or any of a host of other applications. Although the users of such devices in these alternate locations may, in fact, have quite different interests and, consequently, entirely different sets of needs, the developers of such systems have heretofore disregarded this need, relegating such users to buy a plethora of dedicated electronic appliances to satisfy these individual needs.

Some devices have been developed which provide unique information to a system user on the basis of time and/or date. Personal Digital Assistant's (PDA's) such as the Palm Pilot™, by 3COM, Corporation of Santa Clara, Calif., offers a time planner application which will alert a user when it is time for a pre-scheduled event, manually programmed by the system user. Analogously, Global Positioning Systems (GPS) navigation systems provide location based information to a user. However, each of the foregoing are dedicated appliances, incapable of automatically adjusting their user interface and perceived functionality, i.e., their personality based on location or user.

Thus a need exists for a method and apparatus for providing a location based appliance personality, unencumbered by the deficiencies and limitations commonly associated with the prior art.

SUMMARY OF THE INVENTION

In accordance with the teachings of the present invention, a method and apparatus for providing a user interface and information control is described. In accordance with one embodiment of the present invention, a method for providing an appliance personality is presented comprising ascertaining a current location/location type for the electronic appliance, selecting a suitable electronic appliance personality based, at least in part, on the ascertained location/location type of the electronic appliance and provisioning the selected appliance personality on the electronic appliance.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate blocks, however, those skilled in the art will appreciate that such separately delineated blocks should not be construed as necessarily conferring an order dependency in their performance.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
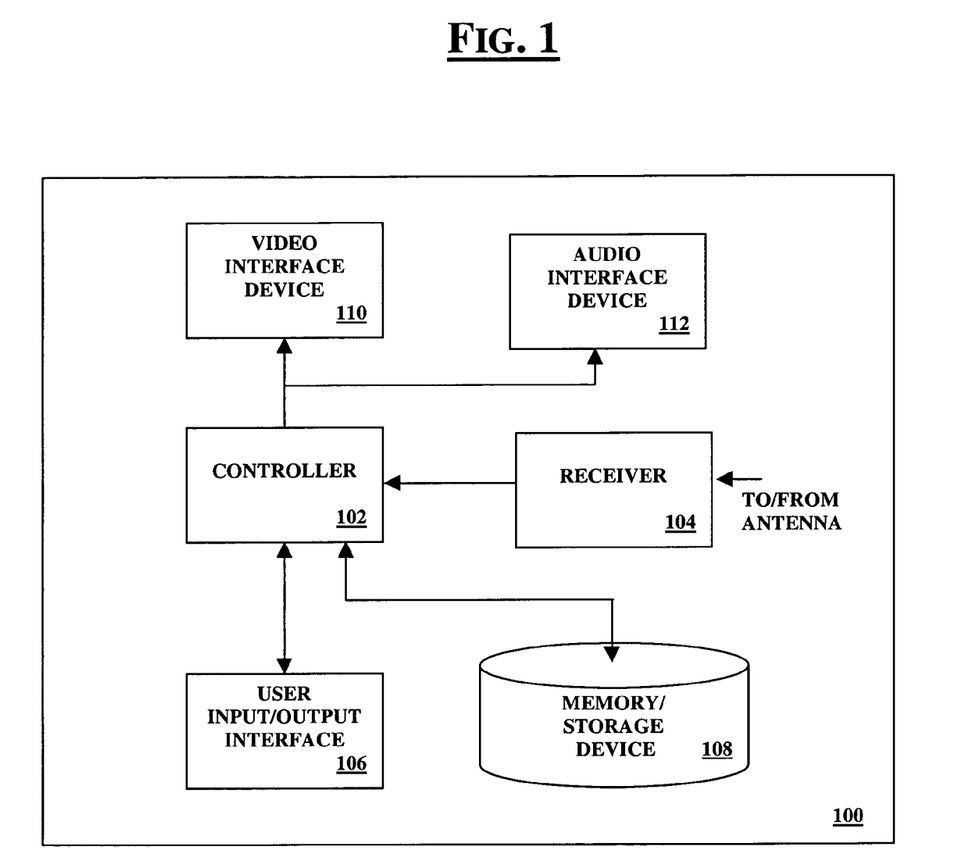
FIG. 1 is a block diagram illustration of an example electronic appliance incorporating the teachings of the present invention.

Referring now to FIG. 1, a block diagram of an example embodiment of an electronic appliance which, in accordance with the teachings of the present invention, adjusts the appliance personality (e.g., user interface and application set) and, therefore, the perceived functionality of the electronic appliance based, at least in part, on an identified current location and/or location type of the electronic appliance appliance. In accordance with the example embodiment of FIG. 1, electronic appliance 100 beneficially includes receiver 104 which receives, downconverts and demodulates signals from any of a number of alternate sources (i.e., signal providers), to extract information from which controller 102 calculates a current location/location type of electronic appliance 100. Based, at least in part, on the identified location/location type of electronic appliance 100, controller 102 (re)configures the user interface and the application set provisioned on the electronic appliance 100 with an appropriate one of a plurality of available appliance "personalities". As used herein, an application set refers to the set of functions/applications available on a typical dedicated electronic device, e.g., a PDA, a cellular telephone, a pager, a personal/portable/notebook computer, and the like. Thus, in accordance with the teachings of the present invention, to be developed more fully below, electronic appliance 100 modifies its appliance personality, and therefore to its perceived functionality, to any of a number of available personalities based, at least in part, on the current location/location type of the electronic appliance. Accordingly, unlike the common prior art electronic devices with a single, dedicated personality, an electronic appliance incorporating the teachings of the present invention has a plurality of such personalities and automatically alters its personality based, at least in part, on the determined location of the electronic appliance.

In one embodiment, for example, electronic appliance 100 incorporating the teachings of the present invention may well take on the personality (e.g., user interface and application set) of a personal digital assistant (PDA) in a first location (e.g., the office), and the personality of a GPS when the appliance is moved to a second location (e.g., a national forest), or while the appliance is mobile. Those skilled in the art will appreciate, from the description to follow, that an electronic appliance incorporating the teachings of the present invention represents a new paradigm in consumer electronics, wherein the electronic appliance tailors its perceived functionality to accommodate the many needs of a typical consumer heretofore requiring a plurality of dedicated electronic appliances.

In addition to those elements enumerated above, electronic appliance 100 is shown comprising user input/output (I/O) interface 106, memory/storage device 108, video interface device 110 and audio interface device 112, coupled together as depicted. As will be described in greater detail below, receiver 104 continuously receives signals from any of a number of alternate sources, e.g., signal providers, providing a signal from which controller 102 calculates the current location information of appliance 100. In one embodiment, for example, receiver 104 is a global positioning system (GPS) receiver, which receives and downconverts signals from any of a number of alternative GPS satellites in orbit around the earth into a form that is recognizable by controller 102. In another embodiment, receiver 104 is a LOng Range Navigation (LORAN) receiver, which receives and downconverts signals from terrestrial LORAN transmitters at known locations. In yet another embodiment, receiver 104 is an Infra Red (IR) receiver, which receives and downconverts signals from an IR transmitter. In each of these embodiments, the received signals contain, among other things, information regarding the location of the transmitter and the time the signal was sent. Based, at least in part, on the information contained in, or associated with the received signal, controller 102 calculates the relative location of appliance 100. In one embodiment, receiver 104 receives such signals from a communicatively coupled antenna (not shown). In one embodiment, the antenna is incorporated into the housing of electronic appliance 100. In one embodiment, the antenna is a photovoltaic cell to receive IR signals.

In addition to receiving location information as described above, receiver 104 also receives communication signals, in certain embodiments. In one embodiment, for example, receiver 104 also receives select ones of cellular telephony, personal communications system (PCS), pager signals, television signals, high-definition television signals, satellite communication signals, and the like. In one embodiment, electronic appliance 100 also comprises a communications transmitter (not shown) enabling electronic appliance 100 to assume the personality of, for example, a wireless telephone adhering to any of a number of alternative wireless telephony and personal communication system standards. In one embodiment, receiver 104 is intended to represent a hybrid combination of two or more types of receivers, thereby providing multiple function capability. Those skilled in the art will appreciate that the general operation of each of such receivers is well known and, thus, they need not be further discussed here.

As indicated above, receiver 104 provides the received and downconverted signal to controller 102 which, as will be described more fully below, utilizes the received information to determine the location of the appliance. In one embodiment, for example, controller 102 determines the relative location of the appliance in relation to the transmitter(s) from which the signals were received. In an alternate embodiment, controller 102 determines the exact geographical location of the appliance, from which a user interface is determined and an appropriate personality is identified. As used herein, controller 102 may well be any of a number of alternate devices known in the art such as, but not limited to a processor, an application specific integrated circuit (ASIC), a programmable logic device (PLD), a programmable logic array (PLA), a special purpose controller, a microprocessor, a microcontroller, and the like.

In addition to determining the location of the electronic appliance, controller 102 controls the provision of user input device 106, video interface device 110 and audio interface device 112. More specifically, controller 102 controls the provision and perceived functionality of a user interface as presented to the user via user input device 106, video interface device 110 and audio interface device 112. In one embodiment, for example, user interface 106 interfaces with a keyboard (not shown) through which a user enters commands and/or data to electronic appliance 100. In an alternate embodiment, video interface device 110 has "touch screen" capability, and user interface 106 interfaces with video interface device 110 to recognize and receive user input via the touch screen. In yet another embodiment, appliance 100 responds to voice commands from an embedded microphone (not shown). Thus, those skilled in the art will appreciate that any of a number of I/O devices may be used to provide an acceptable user interface that complements the selected personality of electronic appliance 100.

As used herein, video interface device 110 and audio interface device 112 are intended to represent any of a number of alternative video interface devices and audio interface devices known in the art. In one embodiment, for example, video interface device 110 utilizes liquid crystal display (LCD) technology to display information to a user of the appliance. In an alternate embodiment, video interface device 110 utilizes plasma display technology to display information to a user. In one embodiment, audio interface device 112 utilizes stereo speaker technology in cooperation with a microphone to enable an audio user interface.

Memory/storage device 108 is similarly intended to represent any of a number of memory/storage devices known in the art. In one embodiment, for example, memory/storage device 108 is a mass storage hard drive. In an alternate embodiment, memory/storage device 108 is a re-writable optical drive. Accordingly, those skilled in the art will appreciate that such elements may well take many forms without deviating from the spirit and scope of the present invention and, thus, need not be further described herein.

Figure 2:
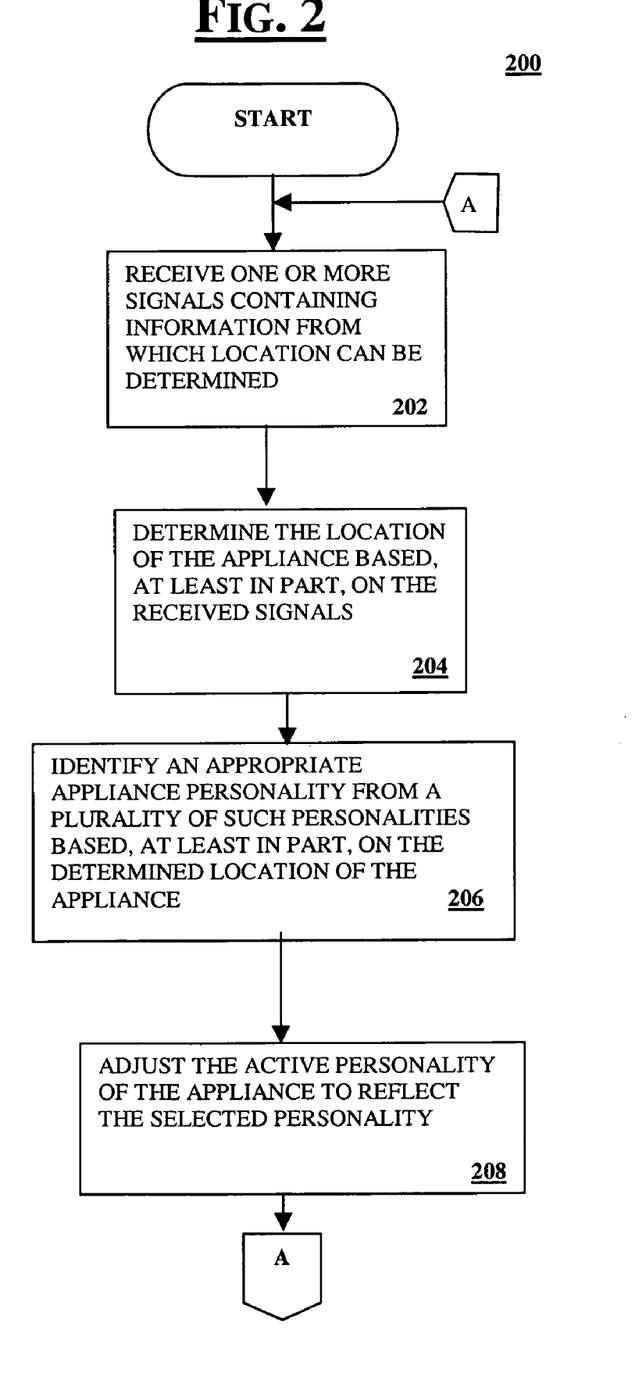
FIG. 2 is a flow chart illustrating an example method for altering the personality of an electronic appliance based, at least in part, on the location of the appliance, in accordance with one embodiment of the present invention.

Having introduced the architectural elements of an example electronic appliance 100 incorporating the teachings of the present invention with reference to FIG. 1, an example method of operation of electronic appliance 100 will be developed more fully with reference to the flow chart of FIG. 2. More specifically, FIG. 2 illustrates a flow chart of an example method for altering the personality of an electronic appliance based, at least in part, on the location/location type of the appliance, in accordance with one embodiment of the present invention. For ease of explanation, and not limitation, the method of FIG. 2 will be developed with continued reference to the electronic appliance of FIG. 1.

Turning to FIG. 2, an example method for altering the personality of an electronic appliance is presented, in accordance with one embodiment of the present invention. In accordance with the illustrated example embodiment of FIG. 2, the method begins at block 202, wherein appliance 100 receives one or more signals containing information from which a location and/or location type of the appliance can be determined. In one embodiment, for example, the signal(s) is (are) detected by an antenna (not shown) and passed to receiver 104, wherein the received signals are filtered, downconverted and demodulated to extract the information from the received signal, as described above. More specifically, in accordance with one embodiment of the present invention, receiver 104 processes the received signal to extract time and location information embedded within the signal denoting when the signal was transmitted. In one embodiment, the location information is a transmitter identifier.

The information obtained from the received signal, along with a timestamp of when the signal was received, is provided to controller 102 which determines the location or location type of appliance 100 based, at least in part, on the information contained in the received signals, block 204. In one embodiment, for example, controller 102 calculates the difference between when the signal was first transmitted and when it was received to determine how far away appliance 100 is from the identified signal source. In one embodiment, controller 102 relies on informational signals received from two or more sources to accurately determine the position of appliance 100, while in an alternate embodiment, a single detailed informational signal may suffice. In one embodiment, for example, controller 102 accesses a location database resident within memory/storage device 108 to identify a particular location based, at least in part, on the relative location calculated from the received signals. In an alternate embodiment, controller 102 accesses a location database within memory/storage device 108 to identify a location type (e.g., hotel, forested region, ballpark, etc) from information embedded within the received signal(s). An example of just such a location database is provide with reference to FIG. 3.

Figure 3:
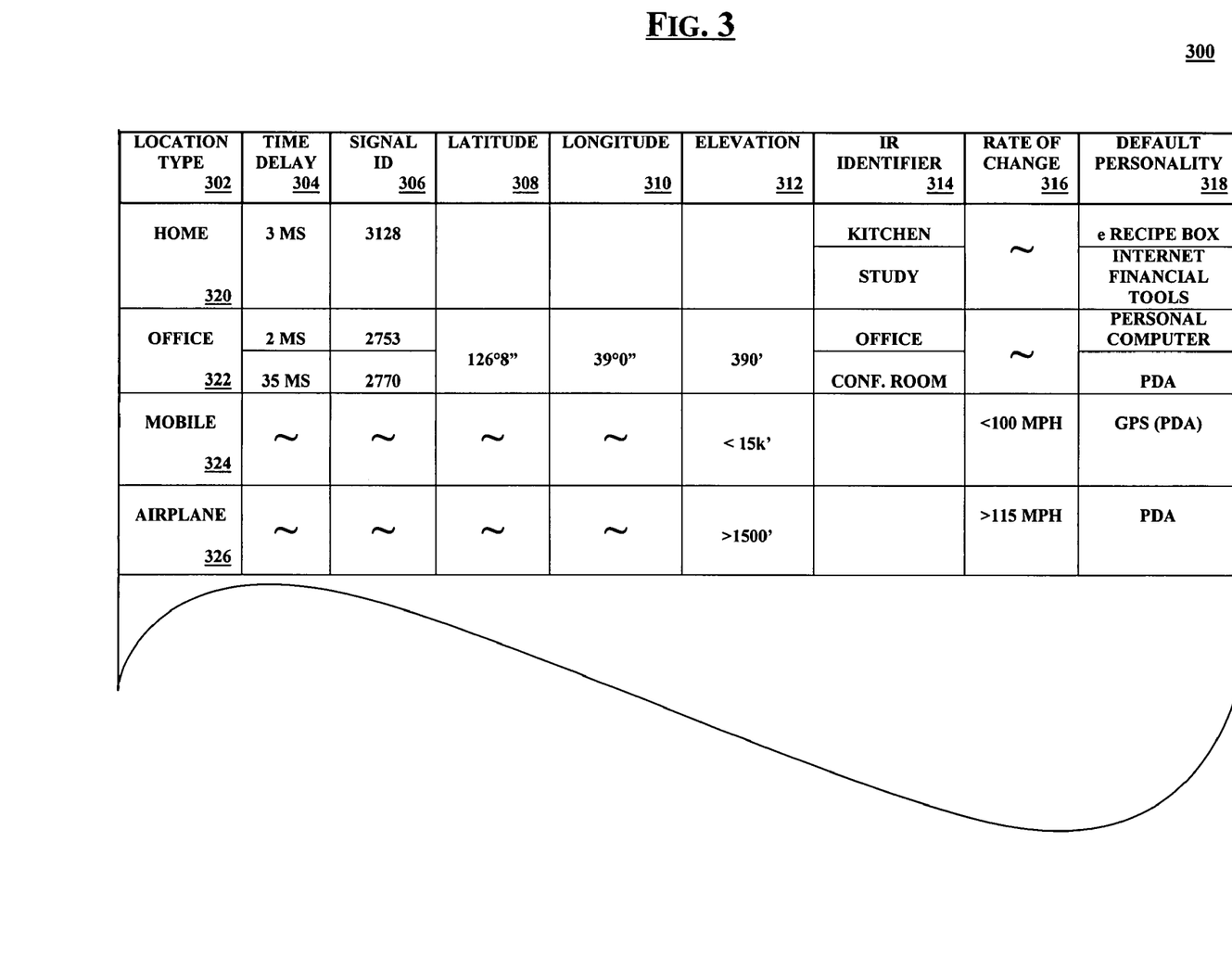
FIG. 3 is a graphical illustration of an example personality database, in accordance with one embodiment of the present invention.

Turning briefly to FIG. 3, a graphical illustration of an example location database is presented, in accordance with one embodiment of the present invention. In accordance with the illustrated example embodiment of FIG. 3, location database 300 is shown comprising a location type field 302, time delay field 304, signal identification (ID) field 306, latitude field 308, longitude field 310, elevation field 312, infra-red (IR) identifier 314, rate of change field 316, and the default personality field 318. As shown, location database 300 is a two-dimensional database correlating location information along the x-axis with location identifiers of particular locations or operating environments along the y-axis. Those skilled in the art will appreciate, however, that location database 300 is but an example and that databases of greater or lesser complexity could well be substituted for location database 300. For example, a three dimensional database may well be used wherein the z-axis is comprised of interface characteristics associated with each of the default personalities listed in default personality field 318.

With continued reference to FIG. 3, location database 300 denotes particular location types and/or operating environments along the y-axis, e.g., home 320, office 322, mobile 324 and airplane 326, to name a few. Along the x-axis in columns 304–316 are stored location information correlated to the particular location type and/or operating environment. For example, if appliance 100 receives a LORAN signal from a transmitter with signal ID 3128, experiencing a time delay of 3 ms, that is but one indication that the appliance is located within the "home" of the user of the device. Further information from, say, an IR transmitter (IR identifier field 314), or a global positioning system (GPS) (e.g., with reference to fields 308–312) enables appliance 100 to further define the location within the home to the kitchen or study, for example. The office location is defined with signals from multiple LORAN transmitters (e.g., fields 304 and 306, as well as a global positioning system (GPS) which provides elevation information as well, e.g., as denoted in elevation field 312.

In accordance with the teachings of the present invention, field 318 denotes a default appliance personality associated with each of the location ID's located in column 302. In one embodiment, a first alternate appliance personality may be denoted in parenthesis 0. In one embodiment, the default personality denoted in column 318 associated with a particular location ID 302 is defined by the user of the appliance with a set-up application. In an alternate embodiment, appliance 100 includes instructions enabling appliance 100 to determine the general operating environment and automatically select a default appliance personality suitable to the identified operating environment. Those skilled in the art will appreciate that the default personality is merely a starting point, the user of appliance 100 can change the dynamically selected personality by selecting an alternate personality. In one embodiment, the user of appliance 100 can alter the user interface and/or application set associated with a personality, thereby further customizing the perceived functionality of appliance 100. In one embodiment, to be described more fully below, electronic appliance 100 depicts an icon associated with a pull-down table of personalities from which the user of appliance 100 may select a suitable appliance personality, adjust the user interface, and/or select/modify the provisioned application set.

In addition to the location database depicted in FIG. 3, electronic appliance 100 may also access other, remote location databases such as, for example, the MapBlast™ web site. Those skilled in the art will appreciate that the MapBlast™ web site enables a user to enter an address, or other geographical coordinates, to identify a particular location. Accordingly, appliance 100 can access such remote location databases to identify the location type/operating environment of the appliance in order to select an appropriate one of a plurality of alternative appliance personalities. Moreover, in one embodiment, when such remote databases are accessed, a select subset or all of the location information available in the remote database is automatically downloaded to the local location database, e.g., location database 300, to reduce the need for further accesses to remote location databases in the future.

Returning to FIG. 2, having determined a location or location type of electronic appliance 100 based, at least in part, on the information extracted from the received signals in block 204, controller 102 identifies an appropriate appliance personality from a plurality of available personalities, block 206. In one embodiment, controller 102 selects user interface characteristics and an application set offering the perceived functionality to provision one of a plurality of available appliance personalities. In one embodiment, for example, controller 102 accesses memory/storage device 108 which has stored therein an interface characteristics/application set database, which correlates a number of interface characteristics and application sets with location types/operating environments and/or appliance personalities. An example of just such an interface characteristics database is presented with reference to FIG. 4.

Figure 4:
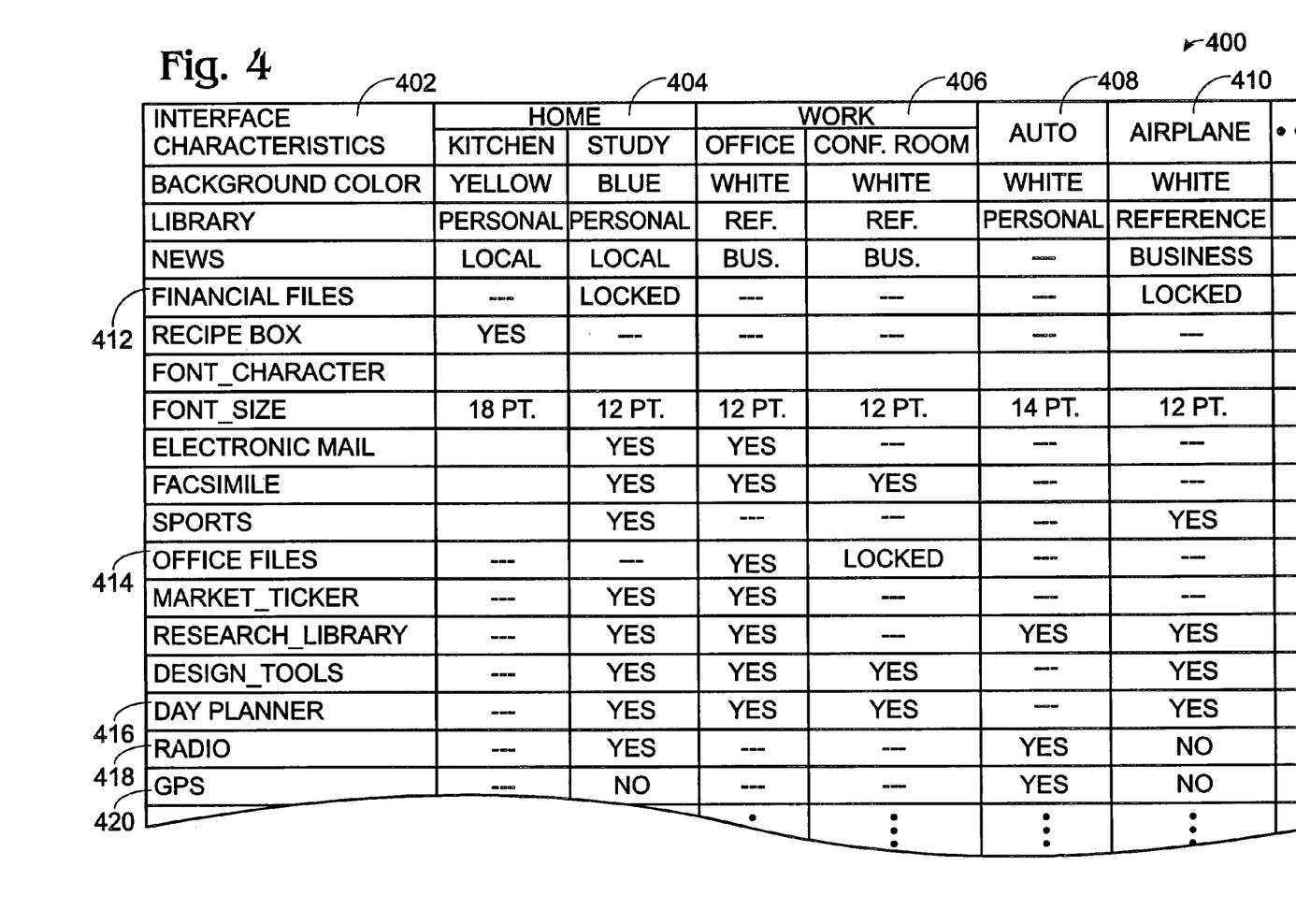
FIG. 4 is a graphical illustration of an example characteristics database, in accordance with one embodiment of the present invention.

Turning briefly to FIG. 4, an interface characteristics database 400 incorporating the teachings of the present invention is presented, in accordance with one embodiment of the present invention. As shown, interface characteristics database 400 is depicted as a two-dimensional database, with a number of interface characteristics denoted along the y-axis, and a number of alternate location types/operating environments correlated along the x-axis. As with the location database presented in FIG. 3, those skilled in the art will appreciate that databases of greater or lesser complexity may well be substituted for interface characteristics database 400 without deviating from the spirit or scope of the present invention.

In accordance with the illustrated example embodiment, interface characteristics database 400 is shown comprising interface characteristics field 402, a home environment type field 404, a work environment type field 406, an auto (or mobile) environment type field 408 and an airplane environment type field 410. As shown, the interface characteristics field 402 may denote such interface features as the background color of the display 401, whether particular icons are denoted on the screen, e.g., financial files icon 412, office files icon 414, and the like, whether the device takes on the personality of a day planner 416, a radio 418, a GPS 420, or any of a plurality of alternative audio/video user interface characteristics and application sets associated with the available appliance personalities.

Returning to FIG. 2, once controller 102 selects an appropriate appliance personality from the database 400 in block 206, controller 102 provisions the selected personality on appliance 100. In one embodiment, for example, appliance 100 may have a default personality of a personal digital assistant such that whenever the appliance is first turned on, or reset, the appliance boots into the PDA personality. However, as appliance 100 receives and processes reference signals, or if it is apparent that the user is not using the features of the PDA, appliance 100 automatically transitions to a personality that corresponds with the identified location of the appliance 100, block 206. Further, as long as appliance 100 continues to operate, the process of updating the appliance personality in accordance with its determined location also continues, as shown. In this way, appliance 100 incorporating the teachings of the present invention automatically adjusts to meet the dynamic demands of ever mobile appliance users.

Figure 5:
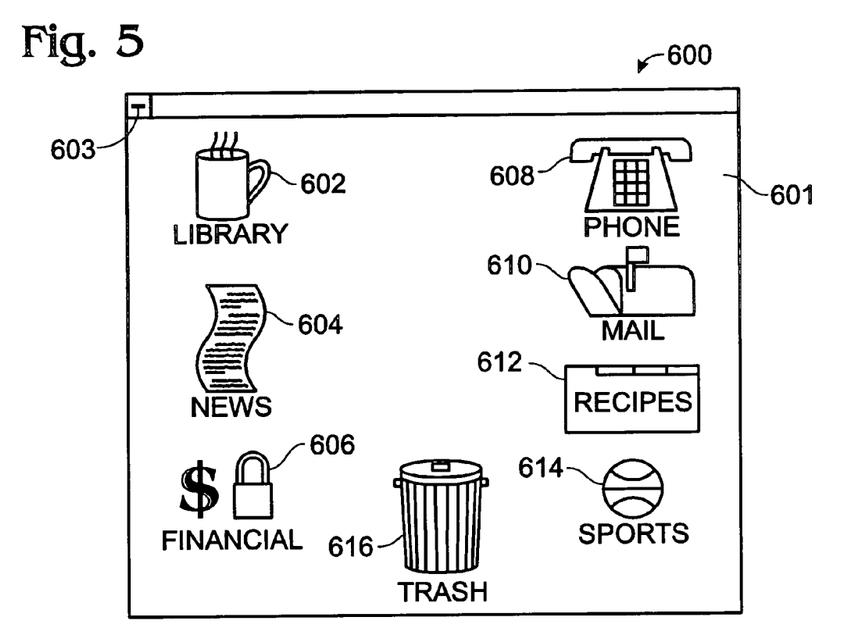
FIGS. 5 and 6 each provide a graphical illustration of example user interfaces for alternate device personalities provisioned by an electronic appliance incorporating the teachings of the present invention, in accordance with one embodiment of the present invention.
Figure 6:
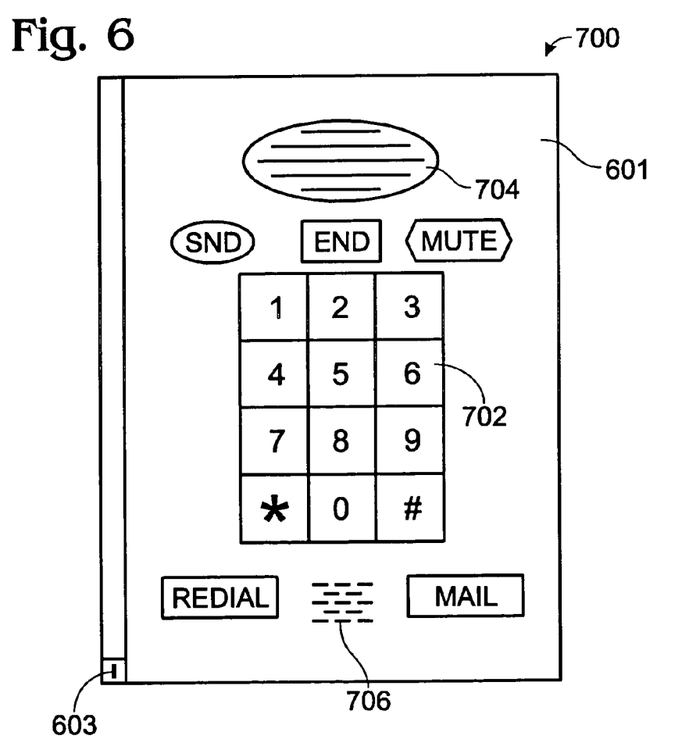

Having described example architectural elements and operation of the present invention with reference to the example embodiments depicted in FIGS. 1 through 4, FIGS. 5 and 6 are presented to provide a couple of example appliance personalities selectively provisioned by innovative electronic appliance 100, in accordance with the teachings of the present invention. Those skilled in the art will appreciate, from the description to follow, that the appliance personalities presented in FIGS. 5 and 6 are intended to represent selected ones of a plurality of user interfaces/appliance personalities available on a single host electronic appliance, the selection based at least in part on the identified location of the host electronic appliance, as described above. Further, those skilled in the art should appreciate that the following examples are merely illustrative of the types of personalities that may be offered by a host electronic appliance. Certainly, other personalities which are dynamically selected based, at least in part, on the identified location of the host electronic appliance are anticipated by the teachings of the present invention.

Turning to FIG. 5, user interface 600 is presented depicting an appliance personality of a personal digital assistant, in accordance with one embodiment of the present invention. In accordance with the illustrated example embodiment of FIG. 5, the visual portion of the user interface 600 is rendered on a video display device 601 displaying a number of icons associated with applications specially provisioned based, at least in part, on the location of the host electronic appliance incorporating the teachings of the present invention, e.g., electronic appliance 100. As shown, user interface 600 denoting visual interface for the PDA personality includes icons associated with a digital library 602, financial files 606, news sites 604, telephone listings 608, an electronic mail application 610, recipes 612, sports news/sites 614 and a trash can 616. In addition to the foregoing, user interface 600 includes a pull-down menu icon 603 in the upper left had corner of display 601. In accordance with one embodiment of the present invention, a user of the host electronic device can override the automatic selection of appliance personality, selecting an alternate personality from a display all available personalities by selecting icon 603. Examples of each of the aforementioned applications/links abound and, as such need not be further described here. Those skilled in the art will appreciate that, in addition to the visual aspects of the user interface, certain electronic appliances may well provide audio aspects to the user interface which, by their nature, cannot be depicted in FIG. 5.

Turning to FIG. 6, display 601 of a host electronic device is presented depicting an alternative appliance personality of a cellular telephone. As shown, display 601 includes an functioning keypad display 702, a microphone display icon 706 and a speaker display icon 704. Those skilled in the art will appreciate that the microphone display icon 706 and the speaker display icon 704 are not a functioning speaker or microphone, but rather are displayed in the general area of where a speaker and microphone are embedded within the electronic appliance, thereby providing a user with the visual queues necessary to position the ear in proximity to the speaker, and the mouth in proximity to the microphone. In accordance with this embodiment of the present invention, display 601 is a touch sensitive screen, enabling a user to interact with the electronic appliance by "pushing" the appropriate "buttons" rendered on display 601. Thus, in accordance with the description above, a single electronic device incorporating the teachings of the present invention provisions the PDA personality depicted in FIG. 5 in one location, while provisioning the cellular telephone personality depicted in FIG. 6 at an alternative location, or as selected by a user from pull-down menu 603.

Figure 7:
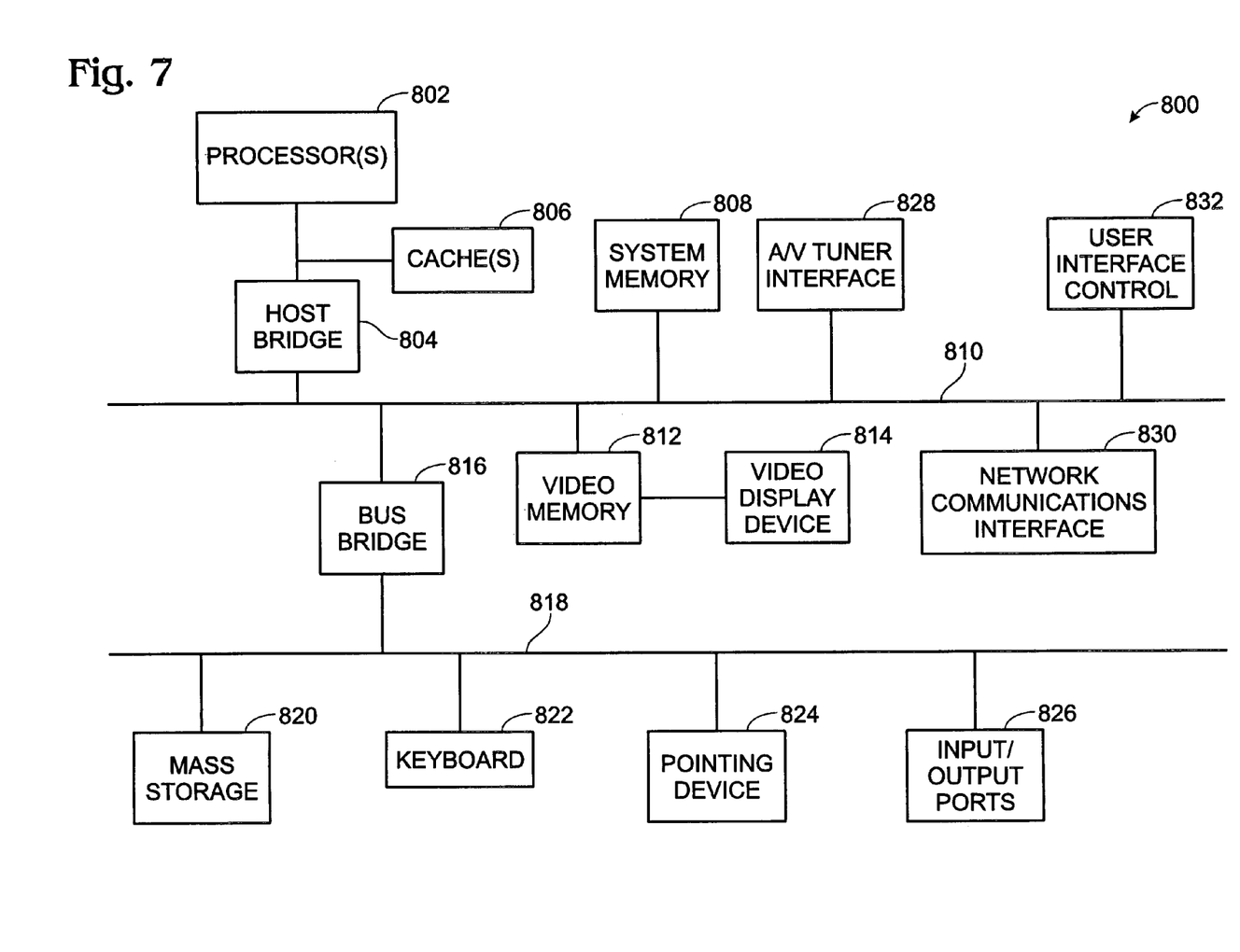
FIG. 7 is a block diagram of an example electronic appliance incorporating the teachings of the present invention, in accordance with an alternate embodiment of the present invention.

Turning to FIG. 7, a block diagram of an example electronic appliance 800 incorporating the teachings of the present invention is depicted, in accordance with an alternate embodiment of the present invention. In accordance with the illustrated example embodiment, electronic appliance 800 is depicted comprising one or more processors 802 with associated cache(s) 806 and host bridges 804 coupling processor(s) 802 to a high speed input/output (I/O) bus 810. In addition, system memory 808, video memory 812, audio/video tuner 828, network communications interface 830, bus bridge 816 and user interface controller 832 incorporating the teachings of the present invention are also communicatively coupled to high speed I/O bus 810, as depicted. In accordance with the teachings of the present invention, user interface controller 832 includes receiver 104 to receive, downconvert and demodulate, signals received from any of a number of transmitting sources to extract information from which user interface controller 832 determines the location of appliance 800, and to control provision of the user interface characteristics and perceived functionality, in accordance with the teachings of the present invention.

As shown, bus bridge 816 couples high speed I/O bus 810 to another, typically I/O, bus 818. In accordance with the illustrated example embodiment of FIG. 7, electronic appliance 800 also includes mass storage device 820, keyboard 822, pointing device 824 and I/O ports 826.

With continued reference to FIG. 7, elements 802–830 perform their conventional functions as known in the art. In particular, mass storage device 820 is used to provide permanent storage for the data and programming instructions to implement the above described functions, whereas system memory 808 is used to provide temporary storage for the data and programming instructions when executed by processor(s) 802. In one embodiment, for example, mass storage 820 stores the location and interface databases associated with the teachings of the present invention. I/O ports 826 are one or more serial and/or parallel communication ports used to provide communication between additional peripheral devices which may be coupled to electronic appliance 800. Network communications interface communicatively couples electronic appliance 800 to other remote devices such as, for example, remote location databases in accordance with the teachings of the present invention. Thus, those skilled in the art will appreciate that, except for the teachings of the present invention, electronic appliance 800 is intended to represent any of a number of alternative well known electronic appliances, including but not limited to general purpose computer systems based on the Pentium® processor, the Pentium® Pro processor, or the Pentium® II processor commonly available from Intel Corporation of Santa Clara, Calif.

Further, it is to be appreciated that various components of electronic appliance 800 may well be re-arranged, integrated, or practiced with greater or lesser functional blocks without deviating from the spirit and scope of the present invention. For example, the peripheral devices shown coupled to standard I/O bus 818 may, in alternate embodiments, be coupled to high performance I/O bus 810; in addition, in some implementations only a single bus may exist with the components of electronic appliance 800 being coupled to the single bus.

In accordance with one aspect of the present invention, the innovative features of the present invention are utilized by software routines run by electronic appliance 800 of FIG. 7. These software routines run a plurality or series of instructions to be executed by a processor, such as processor(s) 802 and user interface controller 832 in electronic appliance 800. Initially, the series of instructions are stored on a storage device, such as mass storage device 820. It is to be appreciated that the series of instruction may be stored on any conventional storage device, such as a diskette, CD ROM, magnetic tape, DVD, laser disk, ROM, flash memory, etc. It is also to be appreciated that the series of instruction need not be stored locally, and could be received from a remote storage device, such as a server on a network, via I/O ports 826. The instructions are copied from the storage device, such as mass storage device 820, into system memory 814 and then accessed and executed by processor(s) 802. In alternate embodiments, the functional routines used to implement the teachings of the present invention are implemented in discrete hardware or firmware. For example, an application specific integrated circuit (ASIC) could be programmed with the above described functions of the present invention.

Figure 8:
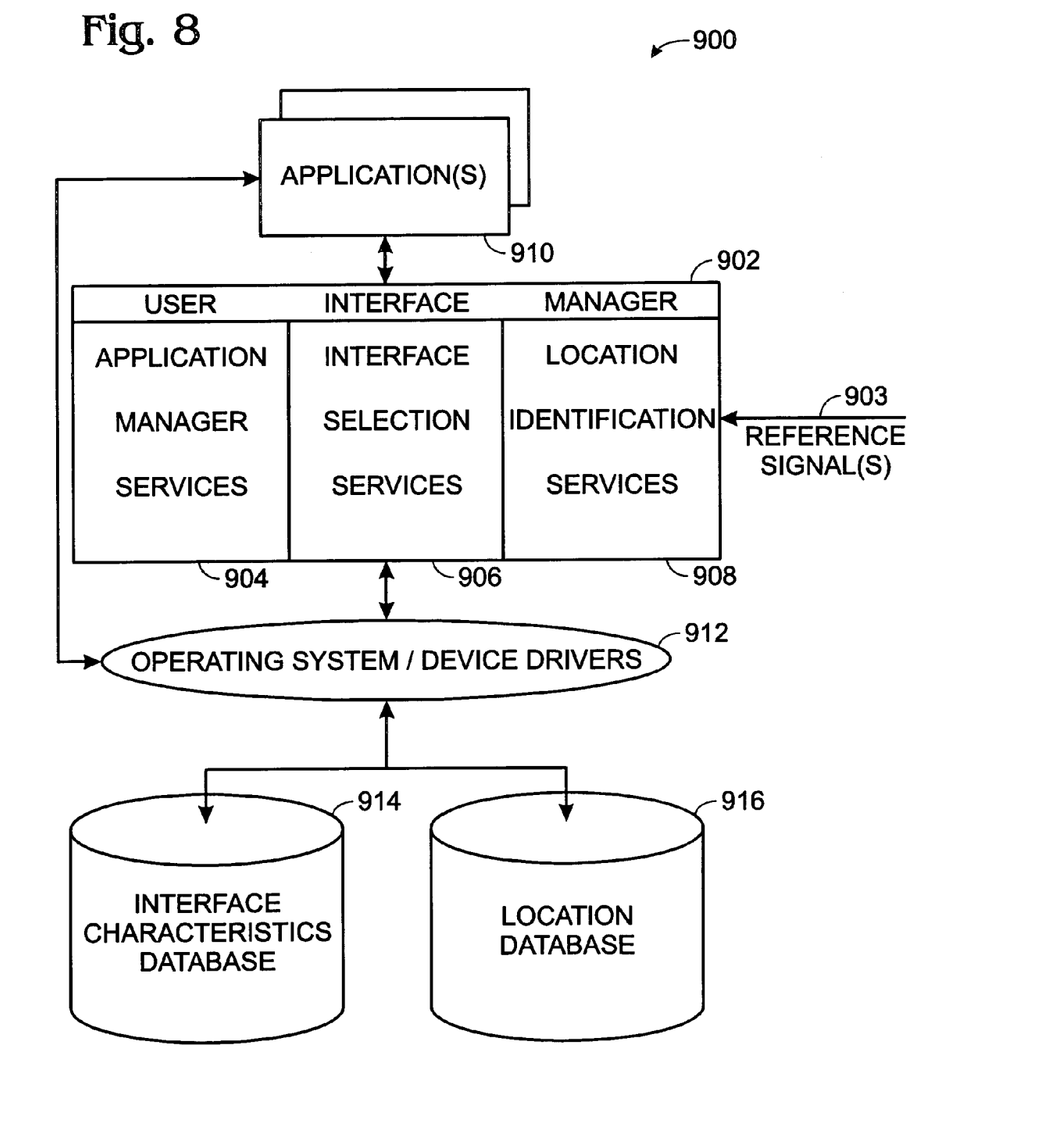
FIG. 8 is a block diagram of an example software architecture for an electronic appliance incorporating the teachings of the present invention, in accordance with one embodiment of the present invention.

Turning to FIG. 8, a block diagram of an example software architecture implemented on an electronic appliance incorporating the teachings of the present invention is presented, in accordance with one embodiment of the present invention. In accordance with the illustrated example embodiment of FIG. 8, software architecture 900 is shown comprising a plurality of applications 910, operating system and device drivers 912 (depicted as one functional block for ease of explanation), and user interface manager 902 incorporating the teachings of the present invention, cooperatively coupled as depicted. Those skilled in the art will appreciate, from the description to follow, that user interface manager 902 includes services for controlling the provision of the user interface and perceived functionality of a host electronic appliance based, at least in part, on received reference signals 903 in accordance with the teachings of the present invention.

In accordance with the illustrated example embodiment of FIG. 8, user interface manager 902 is shown comprising application manager services 904, interface selection services 906 and location identification services 908. As used herein, location identification services 908 determines the location of a host electronic appliance, e.g., electronic appliance 100 or 800, based at least in part on reference signals 903 received from external sources, as described above. In one embodiment, location identification services 908 are a plurality of executable instructions which, when executed by an appropriate processor/controller, implement the method of FIG. 2 to determine the location of the host electronic appliance. In accordance with one embodiment of the present invention, location identification services 908 accesses location database via the operating system/device drivers 912 to identify a location type/operating environment stored therein which corresponds to the information extracted from the received reference signals 903. As described above, however, location identification services may well access remote sources of location identification information via the networking/communication services of operating system/device drivers 912.

Interface selection services 906 control the provision of the user interface of a host electronic appliance based, at least in part, on the location of the appliance as determined by location identification services 908. In accordance with the illustrated example embodiment, interface selection services 906 accesses the interface characteristics database 914 to select appropriate interface characteristics based, at least in part, on the determined location of the host electronic appliance. In one embodiment, for example, interface selection services 906 control the personality of a host electronic appliance through provision of the user interface represented by select ones of applications 910 and operating system/ device drivers 912, as described above.

With continued reference to FIG. 8, application manager services 904 control the provision of and user interface for applications(s) 910 based, at least in part, on the location of the host electronic appliance as determined by location identification services 908. In one embodiment, for example, the personality of the host electronic device is determined by the user interface selected by interface selection services 906 and the selective provision of one or more applications 910 by application manager services 904 based on the determined location of the host electronic appliance.

As depicted herein, applications 910 are intended to represent any of a number of specialty applications known in the art which are executable by electronic appliances. Similarly, operating system/device drivers 912 is also intended to represent any of a number of alternative general operating systems and device drivers known in the art. Those skilled in the art will appreciate that the execution of operating system 912 is initiated from within a basic input/ output system (BIOS) (not shown). Operating system 912 is a general software service which provides an interface between user interface manager 902, application(s) 910 and hardware elements of the host electronic appliance such as, for example, location database 916 and interface characteristics database 914, as depicted. Operating system 912 also provides an interface, such as a graphical user interface (GUI), between the user and the host electronic appliance. According to one embodiment of the present invention, operating system 912 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, the UNIX operating system, available from Santa Cruz Operations of Santa Cruz, Calif., the Be operating system from Be, Inc. of Menlo Park, Calif., and the LINUX operating system.

Those skilled in the art will appreciate, based on the foregoing, that an electronic appliance incorporating the teachings of the present invention is also revolutionary in the ability to accommodate any of a number of mental and/or physical challenges encountered by members of our communities. That is, an electronic appliance incorporating the teachings of the present invention provides the inherent ability to tailor the user interface and device personality to present an audio user interface instead of a visual one to accommodate the visually impaired, or a visual interface in lieu of an audio interface to accommodate the hearing impaired. In alternate embodiments, an electronic appliance incorporating the teachings of the present invention can provide a french-english dictionary to a student in french class, while automatically assuming the personality of a scientific calculator in a math class if such class rooms are equipped with a transmitter providing information regarding the location and course. Thus, those skilled in the art will appreciate that numerous alternate embodiments and implementations of the present invention can be achieved without deviating from the spirit and scope of the present invention.

Thus, alternative embodiments for a method and apparatus facilitating the management of networked devices have been disclosed. While the method and apparatus of the present invention has been described in terms of the above illustrated embodiments, those skilled in the art will recognize that the invention is not limited to the embodiments described. Thus, those skilled in the art will appreciate that the present invention can be practiced with modification and alteration within the spirit and scope of the appended claims. Accordingly, the descriptions thereof are to be regarded as illustrative instead of restrictive on the present invention.

What is claimed is:

1. An electronic appliance implemented method comprising:
   receiving one or more signals containing information from a corresponding one or more sources;
   extracting information embedded within the received one or more signals;
   ascertaining the current location/location type of the electronic appliance from the information associated with the received one or more signals;
   identifying an appliance personality from a plurality of available personalities based, at least in part, on the ascertained current location/location type of the electronic appliance;
   provisioning the identified appliance personality on the electronic appliance but allowing access to all appliance personalities in any location; and
   selecting and providing a user interface and an application set from a plurality of available user interfaces and application sets to reflect the identified appliance personality.

2. The method of claim 1, wherein the one or more sources are satellites designed to provide a global positioning system (GPS) signal.

3. The method of claim 1, wherein one or more sources are cellular communication transmitters designed to provide a plurality of control signals containing information regarding a location of the transmitters and a timestamp of when the received signal(s) were transmitted.

4. The method of claim 1, wherein the current location/location type of the electronic appliance is calculated using a triangulation technique.

5. The method of claim 1, wherein the current location/location type of the electronic appliance is determined by cross referencing a calculated relative position against a database of locations.

6. The method of claim 1, wherein the plurality of appliance personalities are pre-programmed in the appliance and reside in an interface database.

7. The method of claim 1, wherein the plurality of appliance personalities are stored in one or more memory cards which are removably coupled to the electronic appliance.

8. An electronic appliance comprising:
- a receiver, coupled to an antenna, to receive signals including information;
- a processor, coupled to the receiver, to determine a location of the electronic appliance from the received signals;
- a storage medium having stored therein a plurality of processor executable instructions for selectively implementing a plurality of appliance personalities for the electronic appliance, wherein an appropriate appliance personality is selected and provisioned by the processor based, at least in part, on the determined location of the electronic appliance, but access to all appliance personalities in any location is allowed; and
- the storage medium having stored therein a plurality of instructions for a plurality of user interfaces and application sets which are selectively executed by the processor to provision appliance personalities.

9. The electronic appliance of claim 8, wherein the storage medium is removably coupled to the electronic appliance.

10. The electronic appliance of claim 8, wherein the antenna is a global positioning system (GPS) antenna.

11. The electronic appliance of claim 8, wherein the antenna is a radio frequency (RF) antenna.

12. The electronic appliance of claim 8, wherein the antenna is a photovoltaic cell operative to receive infrared (IR) signals.

13. The electronic appliance of claim 8, wherein the plurality of appliance personalities includes a personality unique to a home environment.

14. The electronic appliance of claim 8, wherein the plurality of appliance personalities includes a personality unique to an office operating environment.

15. The electronic appliance of claim 8, wherein the plurality of appliance personalities includes a personality tailored for a mobile operating environment.

* * * * *